(12) United States Patent
Krajicek et al.

(10) Patent No.: US 9,030,688 B2
(45) Date of Patent: May 12, 2015

(54) SYSTEM FOR SCALABLE PROCESSING OF FILES IN THE CLOUD

(75) Inventors: Ondrej Krajicek, Brno (CZ); Martin de Martini, Prague (CZ)

(73) Assignee: Y Soft Corporation, a.s., Brno (CZ)

( * ) Notice: Subject to any disclaimer, the term of this patent is extended or adjusted under 35 U.S.C. 154(b) by 129 days.

(21) Appl. No.: 13/364,363

(22) Filed: Feb. 2, 2012

(65) Prior Publication Data

US 2013/0188214 A1 Jul. 25, 2013

(30) Foreign Application Priority Data

Jan. 25, 2012 (DK) .................................. 2012 70041

(51) Int. Cl.
*G06K 15/02* (2006.01)
*G06F 3/12* (2006.01)

(52) U.S. Cl.
CPC ............ *G06F 3/1204* (2013.01); *G06F 3/1238* (2013.01); *G06F 3/1267* (2013.01); *G06F 3/1288* (2013.01)

(58) Field of Classification Search
USPC .................................. 358/1.14, 1.15; 709/203
See application file for complete search history.

(56) References Cited

U.S. PATENT DOCUMENTS

| 2004/0044776 | A1  | 3/2004  | Larkin |
| 2006/0059544 | A1  | 3/2006  | Guthrie et al. |
| 2008/0071792 | A1* | 3/2008  | Li et al. ........................... 707/10 |
| 2008/0155058 | A1  | 6/2008  | Prasad et al. |
| 2010/0235431 | A1* | 9/2010  | Poluri et al. .................. 709/203 |
| 2011/0078532 | A1  | 3/2011  | Vonog et al. |
| 2011/0307571 | A1* | 12/2011 | Bakke ........................... 709/208 |
| 2012/0013948 | A1* | 1/2012  | Morooka ..................... 358/1.15 |

FOREIGN PATENT DOCUMENTS

| EP | 1 229 724 A2   | 8/2002  |
| WO | 2009/073566 A1 | 6/2009  |
| WO | 2011/141464 A1 | 11/2011 |

* cited by examiner

*Primary Examiner* — Qian Yang
(74) *Attorney, Agent, or Firm* — Roberts Mlotkowski Safran & Cole, P.C.; David S. Safran

(57) ABSTRACT

A system for transmission of files, which files are generated by a first user at a first client station, which first client station is connected by a first computer network such as a Local Area Network (LAN) to one or more local servers, which first server performs communication to a number of computer systems connected to the first LAN. Worldwide net scalable files transferring processes without the need for transferring the files over the wide area net, but to retain the user's full access to any file are achieved and storage of large files at a plurality of servers during and after data transmission prevented.

12 Claims, 1 Drawing Sheet

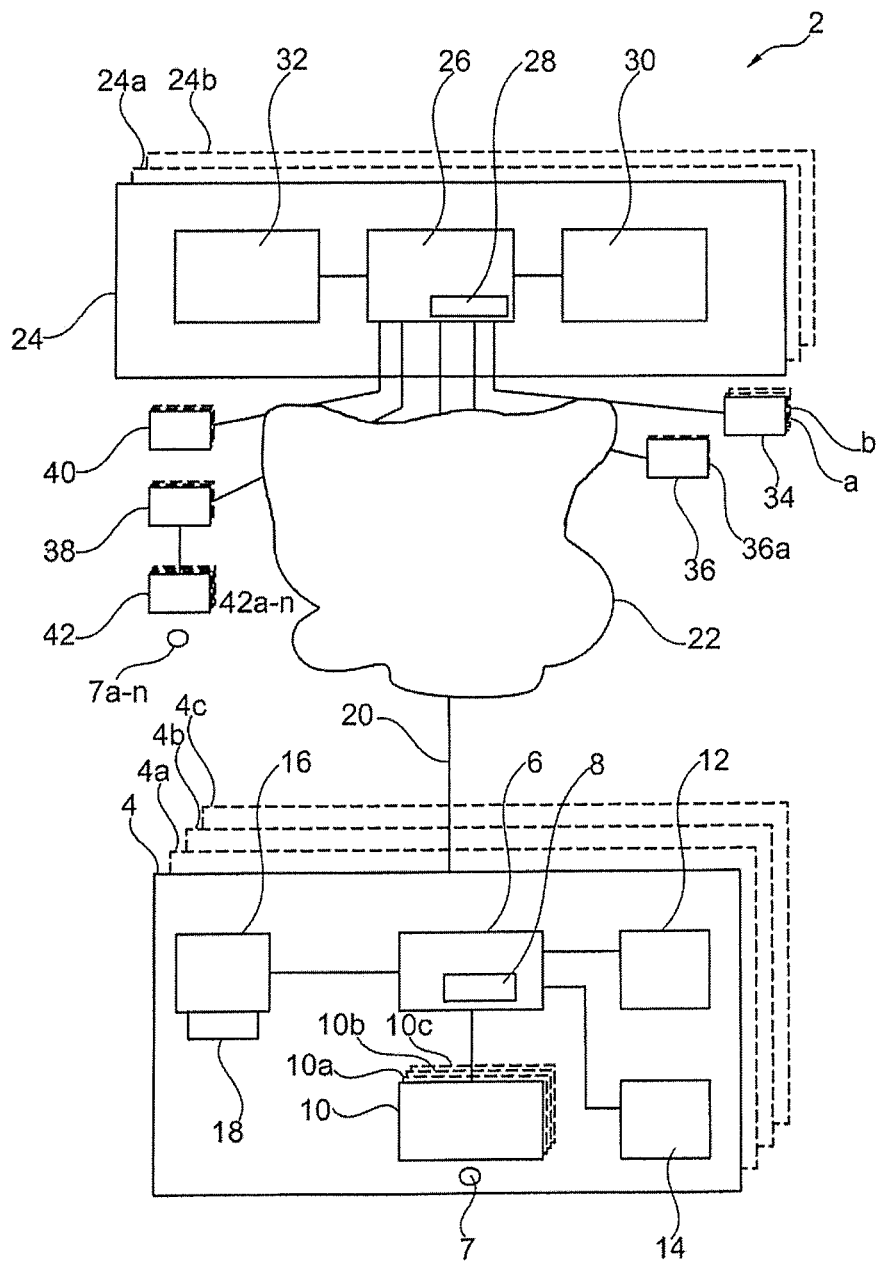

SYSTEM FOR SCALABLE PROCESSING OF FILES IN THE CLOUD

BACKGROUND OF THE INVENTION

1. Field of the Invention

The present invention relates to a system for secure transmission of files, which files are generated by a first user at a first client station, which first client station is connected by a first Local Area Network (LAN) to one or more local subordinate servers, which first server performs communication to a number of computer systems connected to the first LAN.

2. Description of Related Art

U.S. Patent Application Publication 2011/0078532 A1 discloses a method and system for providing computer-generated output and in particular graphical output. The system includes a network configured to carry digital information. The system includes a server in communication with the network, the server configured to execute an application and a cloud engine module. The application provides a graphical output. The output capturing and encoding engine module is further configured to intercept the graphical output from the application on the server. The output capturing and encoding engine module is further configured to convert the graphical output into at least one of: graphical commands and video codec data. The output capturing and encoding engine module is further configured to transmit the converted output over the network. The system includes a client in communication with the server over the network, the client configured to execute a graphics and video decoding and rendering engine module. The graphics and video decoding and rendering engine module is configured to, responsive to receiving the transmitted converted output, rendering the graphical output. The graphics and video decoding and rendering engine module is configured to intercept graphics and video decoding and rendering inputs at the client. The graphics and video decoding and rendering engine module is configured to transmit the intercepted user inputs to the output capturing and encoding engine module.

The state of the Art comprises two main areas where print control systems and techniques are applied.

One significant family of print control systems covers standard systems, which provide customer-centric deployment of said print control systems and control of user printing based on capturing the document during the spooling process.

The second family are the cloud based print control systems, where the system is user-centric, i.e. it does focus on providing a print control system features to users leveraging the cloud infrastructure and not imposing any maintenance costs to the organizations such as employers of the said users and often providing different ways of billing and profit generation than by selling software licenses to the customers. Examples of such systems are known under their marketing names Google Cloud Printing, HP ePrint and others.

Traditional Print Control Systems simply do not offer the benefits of the Cloud:

Zero Deployment of the application and services requiring usually no or substantially reduced costs of purchased software, hardware or other resources compared to traditional software and/or hardware products. Different Billing and Payment Models such as pay-per-use pay-per-click, pay-per-view. In the context of the Print Control Systems, this basically means that the purchasing costs of the system for the customer are minimal or non-existent and the whole price of the solution Current cloud based print control systems bring many benefits typical for other cloud applications to printing, but suffer from additional drawbacks, which complicate or disqualify the deployment of cloud based print control systems in real customer environment. Cloud based print control system has essentially the same purpose as the traditional print control system: to route a user document in a digital form through a series of actions and transformations to the intended or appropriate printer, copier or multi-function printer device by means of so called spooling process. By extension to multi-function printer devices and scanners, the purpose of a print control system cloud-based or traditional is to route a document in hard copy form. The drawbacks of the cloud based print control systems are: Print Job Exposure print jobs are routed to the cloud, i.e. print job data always leave the infrastructure and control of the end user organization. To preserve data integrity and confidentiality print job encryption and digital signature has to be employed, which is today not usual and might be problematic. By deploying an integrity protection mechanism, such as digital signatures, certain features simply cannot be implemented such as print job conversion, grayscale or duplex enforcement, etc. as such transformations need to modify print job data.

Wide Area Network Bandwidth Consumption when print job are transferred back and forth to the cloud. Print jobs can be very large files and their sizes usually vary from MBs to GBs. All these data have to be transferred. Wide Area Network connection usually provides less bandwidth and increased latency when compared to the LAN in most cases, so aside from incurred costs, user experience may also be hampered due to increased waiting times due to increased network latency.

Strong Dependency on the Cloud current cloud based systems rely on the Internet connection and perform all operations online. When network connection to the cloud such as an Internet connection is not working or available, cloud based print control systems cannot provide any services to the users.

SUMMARY OF THE INVENTION

It is the object of the invention to achieve worldwide t scalable files transferring processes without the need for transferring the files over the wide area net, but to retain the user's full access to any file. A further object of the invention is to prevent storage of large files at a plurality of servers in the corporate or public data center during and after data transmission and processing.

The object can be fulfilled by a system or a method where a first server can generates and transmits at least one meta data file related to the file stored in the data cache by the internet to a Master Server Unit (MSU), which MSU is part of a corporate or public data center (CDC), to which CDC a number of second servers are communicating, where any user can access the meta data file by authorization to related to spooled file by a second client station by a second LAN connection to each of the second servers.

Hereby it can be achieved that a user can store a file in the data cache at the server and maybe travel to somewhere else in the world where in the meantime the system has transmitted a meta file to one or more, or maybe a group, of master server units or one, or more, or maybe a group of servers, which MSUs or servers could be part of a number of different corporate or public data centres worldwide. Having arrived at a destination after a travel, via a client station to a local subordinate server the user can access the nearest master server unit(s) or the nearest server, depending on the system configuration, and in fact, in the meantime, a meta data file has been transmitted already so that access is provided to that meta data file in the appropriate MSUs or servers that are part of the family or the meta file transfer is initiated by the user interaction with said nearest MSU(s) or servers and the user will have to wait for the transfer to finish before proceeding. The system may automatically notify the user upon transfer completion. From the server the user has access to this meta file and as soon as the user has provided valid credentials, the user has access to his file(s) which he can then process or have processed (such as printed) in a traditional manner. In this way a follow-me system is achieved that operates in a highly efficient manner because no files are transmitted; only the meta data file is transmitted to master service units worldwide. It is also possible by this invention that a group of users have access to the same file, simply because they already have credentials which could be used when they have received the meta file to get access to the file. In this way, it is possible in large organisations to transmit, for example, documents to a lot of sub-offices where the documents are kept more or less all the time in the company, because the communication of maybe the secured document is performed directly through the computer communication systems without any storage somewhere in the world at servers waiting for further transmission. The transmission of data is in that way performed in a much cheaper way, because there will no payment for storing of large files at server somewhere in the world, such as by leveraging cloud-based file storage services. By traditional cloud transmission of, for example, documents, the user has to pay for a large database somewhere in the cloud in order to have access to all the files. By the pending application, there is only a very small meta file that is being transmitted through the cloud between different data centres. The meta file comprises only a small data set compared to the files which have been transmitted. The use of storage in the cloud is probably reduced with more than 99%. Together with the saving in storage, a higher degree of security and privacy is also achieved, because nobody can get secret information from the meta file itself because it is simply not there.

The server comprises a data cache, which data cache receives and performs a spooling process of the file generated at the client station, which data cache performs a temporary storage of the spooled file.

Because the meta data file has a limited size anyhow, there is no problem in storing the meta file in thousands of servers worldwide, however the meta file is only transferred to the servers or MSUs where it is really needed, such as the MSUs and the servers where the respective users are known to be operating frequently. The file is not transmitted until the users have logged in on at client stations to another server; however, the files are not stored in the servers on its way to the client station. Seen from a point of view of security it is very important that a file, which, so to speak, is sent out into the cloud, is not present there, but only the meta data file is available in the cloud. Therefore, a high degree of security is maintained because only the user has the necessary credentials required for accessing first the meta file, and subsequently to the files.

The servers can communicate by LAN or general computer network to and from an identity database. In order to transmit a meta data file it is important that the subordinate server can exchange data with an identity database or with the associated MSUs and in that way combine the user identifier, such as login name, with further data that has to be part of the meta file.

The data cache in the server can receive configuration data from the MSU. Hereby it is achieved that the data cache has received data and in that way it is ensured that the MSU receiving information is the correct MSU and that the data stream is transmitted in a language and a form that can be received by the MSU.

The communication to and from the server to and from the MSU may be encrypted and authenticated at both ends. Hereby it is achieved that that all the data transmitted has a high degree of security, integrity and confidentiality.

The communication to and from the server to and from the MSU is asynchronous. By asynchronous communication it is possible to transmit the data in periods where the data traffic is limited so there is sufficient space for the data transmission over the communication lines. The asynchronous communication further helps in keeping a high degree of security and scalability because asynchronous communication makes it possible to have data transmitted as packages in different roads in the data communication landscape.

Users can get access in a roaming mode to any server, which server recognizes the users access, the server requests the MSU or the appropriate server for data transmission from the server when the users is connected.

The present patent application further concerns a method for scalable processing of files, which method comprises the following steps:

a. A first user generates a file at a first client station,
b. transmit the file from the first client station by a first LAN to a server,
c. perform a spooling process at an server connected to the first LAN,
e. store the spooled file in a data cache storage in the server,
f. transmit meta data related to the spooled file to an MSU,
g, the MSU gives access to any server sending related authentication information to the meta data file,
h. transmit the spooled file from the data cache in the first server to he MSU and further to the actual server,
i. transmit the spooled file from the server by a LAN to a second client station.

By the method as described above, it is possible to achieve a high degree of security and scalability in transmitting files or other data packages from a user at a client station to any computer system for processing placed somewhere else in the world where the data files or files are ready for being processed when one or more user s triggers such processing if valid credentials are provided. Any user who has valid credentials will in that way have access to files stored locally at a server, maybe placed thousand of kilometers away. Just by using the meta file and perform an authorisation, the file will be transmitted directly. Hereby can distribution of files be performed to a big group of users, or maybe one user can travel from one part of the world to another and have access to own document only. By transmitting large files, it is very important that the file transmission is performed directly and no storage is performed in data centres somewhere in the world. It is very expensive to perform storage of large data amounts somewhere in data centres. Therefore, by this invention only meta files are sent for the data centres for storage. Because the meta file only contains an authorisation code and a reference to the file, the meta file comprises only a relatively small data amount compared with the actual file that has to be transmitted. Probably a large file will also be transmitted significantly faster, because there will be a direct connection link between the server that transmits the file from the chase memory directly over the internet to the receiver.

In the pending patent application the wording "File" is used for any data set, such as any computer generated document, any digital images or any computer program.

In the pending patent application the wording "client station" is any computer system, such as a mobile phone, tablet computer, digital camera.

BRIEF DESCRIPTION OF THE DRAWING

The sole FIGURE shows a possible embodiment for an internet communication system as the system described in the pending application.

DETAILED DESCRIPTION OF THE INVENTION

The FIGURE shows a first possible disclosure of a system 2, which system comprises a Local Area Network (LAN) 4 and behind is indicated further LANs 4A, 4B, 4C, but it is to be understood that the number of LANs could be extremely high and by extension, the number of (subordinate) servers can be extremely high. The first LAN 4 comprises a subordinate server 6 which server 6 comprises a data chase 8 and which server 6 is connected to a plurality of client's stations 10, 10a-n, which client stations are operated by users 7 7a-n, and it is of course understood that a plurality of users each could use their own client station. The server 6 is further connected to an identity database, for example, an active directory 12 and connected to an SMTP mail server 14. Further is the server 6 connected to a network printer 16 which network printer comprises a terminal 18. The server 6 is further connected by a communication line 20 to the cloud 22. The cloud 22 is a commonly accepted description for the world wide net. The cloud 22 is further connected to a corporate data centre 24 which is only one of a number, and therefore is indicated corporate data centres 24a-24n. The corporate data centre comprises at least a master server unit which takes care of the communication to the cloud 22. This master server unit MSU 26 comprises a SQL database 28. The MSU 26 is communicating with a central reporting server 30, and further is the server communicating with a SMTP mail server 32. The MSU 26 is further communicating with a number of servers 34, 34a-n, 36, 36a-n, 38, 38a-n, 40, 40a-n. Each of these servers can be connected to a plurality of client stations as indicated by 42, 42a-n. All these client stations could be operated by users 7, 7a-n.

In operation a file generated by the user 7 at the client station 10 will by the system be stored in the data base 8 at the server 6, and the server can by an identity management integration point that refers to the identity database 12 generate a meta file. This meta file is then transmitted from the server 6 over the communication line 20 into the cloud 22. From this cloud can a high number of corporate data centres have access to that meta file and reach a copy of it which is stored on the servers. From here the meta file can be further communicated to a high number of servers 34, 34a-n, 36, 36a-n, 38, 38a-n, 40, 40a-n where at each server, a number of client stations 42, 42a-n are connected.

In one possible embodiment the invention could be used for follow-me print roaming. In some environments where cloud printing systems are deployed for managing print, copy, scan and fax security and accounting over a wide network of locations, there is often a need to provide a local company-wide print follow-system for roaming users at any location within a company using stationary workstations or portable computers for printing to any configurable printers at any location. Another typical usage of the system would be optimized cloud printing where print jobs are (as files) processed locally, but the system is managed by and from the cloud so that the system provides advantages in terms of privacy and incurred transmission and storage costs over current cloud printing systems known to the art.

What is claimed is:

1. System for transmission of files including print and/or scan jobs, which files are generated by a first user (7) at a first client station (10), wherein the first client station (10) is connected by a first computer network including a first Local Area Network (LAN) (4) to one or more local servers comprising a first local server (6) that performs communication to a number of computer systems (10a-n) connected to the first LAN (4), wherein the first local server (6) generates at least one meta data file related to a file stored in a data cache (8) and transmits the at least one meta data file to a corporate or public data centre (CDC) (24) comprising at least one Master Server Unit (MSU) (26), wherein a number of second servers (34, 34a-n, 36,36a-n, 38,38a-n,40, 40a-n) are in communication with the CDC (24) so as to receive the at least one meta data file from the at least one master server unit of the CDC, wherein the first user or a number of users access the meta data file by authorization related to the file stored in the data cache (8) by any second client station (42) to any of the second servers (34, 34a-n, 36,36a-n, 38,38a-n,40, 40a-n) via a second LAN connection and request transfer of the file for local processing of the file transferred, wherein the data cache (8) in the servers (6, 36, 36a-n, 38,38a-n,40, 40a-n) receives configuration data or control data from the MSU (26), and wherein, upon authorization, the file is transferred from the first local server (6) to the second client station (42) by way of: the first local server (6) communicating with the MSU (26) via a cloud network, the MSU (26) communicating with the one of the second servers (34, 34a-n, 36, 36a-n, 38, 38a-n, 40, 40a-n) via the cloud network, and the one of the second servers (34, 34a-n, 36, 36a-n, 38, 38a-n, 40, 40a-n) communicating with the second client station (42) via the second LAN.

2. System according to claim 1, wherein the system is a print system.

3. System according to claim 1, wherein the first local server (6) comprises the data cache (8) and performs a spool process, and wherein the data cache (8) receives a spooling document file generated at the first client station.

4. System according to claim 1, wherein the communication to and from the first local server (6) to and from the MSU (26) is encrypted and authenticated at both ends.

5. System according to claim 1, wherein the communication to and from the first local server (6) to and from the MSU (26) is asynchronous.

6. System according to claim 1, wherein the users (7,7a-n) have access in a roaming mode to any of the first local server (6) and the second servers (34, 34a-n, 36,36a-n, 38,38a-n,40, 40a-n), wherein the first local server (6) and the second servers (34, 34a-n, 36,36a-n, 38,38a-n,40, 40a-n) are able to recognize the users (7,7a-n) access, and the servers are able to request the MSU (26) for data transmission from any of the first local server (6) and the second servers (34, 34a-n, 36,36a-n, 38,38a-n,40, 40a-n) when any of the users (7,7a-n) is connected.

7. System according to claim 6, wherein the first user has access to the meta data file related to the files at any the first local server (6) and the second server (34, 34a-n, 36,36a-n, 38, 38a-n, 40, 40a-n), and wherein the first user by authorization downloads the file to the actual second client station or printer system.

8. System according to claim 1, wherein the MSU (26) comprises an SQL database, and wherein the CDC 24 comprises the MSU (26), an SMTP Mail Server (32) and a central reporting server (30).

9. System according to claim 1, wherein upon the authorization:
- the file is transferred from the first local server (6) to the MSU (26) via the cloud network;
- the file is transferred from the MSU (26) to the one of the any of the second servers (34, 34a-n, 36, 36a-n, 38, 38a-n, 40, 40a-n) via the cloud network; and
- the file is transferred from the one of the any of the second servers (34, 34a-n, 36, 36a-n, 38, 38a-n, 40, 40a-n) to the second client station (42) via the second LAN.

10. Method for secure transmission of files including print and/or scan jobs, comprising the following steps:
- a. generating, by one or more first users, a file at a respective one of one or more first client stations (10),
- b. transmitting the file from the first client station by a first LAN (4) to a first server (6),
- c. storing the file at the first server (6) connected to the first LAN (4) and generating a meta data file related to the file stored at the first server (6),
- d. transmitting, by communication through a cloud network, a meta data file related to the stored file to at least one master server unit (MSU) (26) that is part of a corporate or public data centre (CDC) (24), and transmitting the meta data file from the MSU (26) to any of a number of second servers (34, 34a-n, 36,36a-n, 38,38a-n,40, 40a-n) communicating with the CDC (24) via the cloud network,
- e. the MSU (26) giving access to transfer the stored file towards the one or more of first users when the respective second client station is connected at any of the second servers (34, 34a-n, 36,36a-n, 38,38a-n,40, 40a-n) by sending authentication information related to the meta data file,
- f. transmitting the stored file from a data cache (8) in the first server (6) to the MSU (26) and further to the any of the second servers (34, 34a-n, 36,36a-n, 38,38a-n,40, 40a-n) to which the respective second client station is connected,
- g. transmitting the file from the second server (34, 34a-n, 36,36a-n, 38,38a-n,40, 40a-n) by a second LAN to the respective second client station or computer system for local processing of the transmitted file.

11. Method according to claim 10, further comprising storing of the spooled file in the data cache (8) storage in the first server (6).

12. Method according to claim 10, wherein the MSU (26) comprises an SQL database, and wherein the CDC 24 comprises the MSU (26), an SMTP Mail Server (32) and a central reporting server (30).

* * * * *